June 24, 1969 C. L. SCHULER ET AL 3,452,267

HIGH VOLTAGE RECTIFIER

Filed Jan. 31, 1968

INVENTORS
CHESTER L. SCHULER
DAVID H. MARGOLIEN
FRED M. BLATT

Joseph Weingarten
Stanley M. Schwartz
ATTORNEYS

United States Patent Office 3,452,267

Patented June 24, 1969

3,452,267
HIGH VOLTAGE RECTIFIER
Chester L. Schuler, Wayland, David H. Margolien, Lexington, and Fred M. Blatt, Needham, Mass., assignors to Unitrode Corporation, Watertown, Mass., a corporation of Maryland Filed Jan. 31, 1968, Ser. No. 702,109
Int. Cl. H02m 7/04; H01l 5/00
U.S. Cl. 321—27 8 Claims

ABSTRACT OF THE DISCLOSURE

A modular high voltage rectifier having an axially symmetric, generally hemispherical insulative housing, with a polar cap forming one terminal, and a circular base forming the other terminal. A series string of solid state diodes within the housing is connected between the two terminals of the device, the diodes being structurally supported to enhance thermal and electrical efficiency by means of a plurality of insulative discs attached to the circular base and arranged in a path symmetric about the axis of the device.

*Field of the invention*

The present invention relates generally to electrical energy conversion and more particularly to solid state high voltage rectifiers.

*Background of the invention*

Solid state semiconductor diodes are widely employed as electrical rectifiers, and for many applications such solid state devices have replaced the older more cumbersome vacuum tubes and gaseous discharge tubes. In the rectification of high voltages, however, conventional solid state rectifiers are often unsuitable to reliably and efficiently operate at the high voltages for which they are intended. At increasingly higher voltages, the problems of voltage gradient, electrostatic forces and corona discharge become correspondingly more severe, and the geometry, insulating materials and heat dissipation means must be more carefully chosen to provide a suitable rectifier package which is operative at these high voltages.

In order to withstand voltages exceeding the rating of an individual semiconductor diode, it is customary to employ an assembly of serially connected diodes to form a diode "string." Conventional series strings of diodes have been packaged in cylindrical dielectric cartridges because the cylindrical shape is advantageous for high voltage use due to the increased anti-corona radius at the dielectric surface. In addition, efforts were made to avoid sharp corners, projections and surface discontinuities to minimize destructive ionization. Encapsulating techniques have also been applied to increase the dielectric strength and consequent resistance to voltage breakdown in a particular operating environment. Such cylindrical cascaded diode devices have in general been unsuitable for proper operation at very high voltage potentials.

Certain compensation techniques have been developed and are known to extend the voltage range of series connected solid state diodes. For example, each diode in the string can be shunted by a relatively high resistance to maintain an appropriate voltage distribution under static conditions and shunted by a capacitor to provide stability under transient conditions. The employment of such shunt resistors and capacitors impose additional problems on the packaging of high voltage rectifiers, while reducing the electrical efficiency of the rectifier and increasing the power dissipation of such a device.

A high voltage rectifier which has solved the problems of the prior art and which has met with substantial commercial success is described and claimed in United States Patent 3,335,339 of Chester L. Schuler, assigned to the assignee of the present invention. In brief, this prior high voltage rectifier has an axially symmetric, generally hemispherical body of insulating material between a first electrical terminal comprising a conductive polar cap, and a second electrical terminal comprising a larger diameter conductive base having a corona-reducing, smoothly rounded external edge. The series connected rectifying circuit is encapsulated within the insulating material and is spirally disposed between the cap and base terminals. The novel packaging arrangement of this rectifier provides minimal external surface voltage gradients and corona discharge with maximal cooling, reliability and power conversion efficiency. The hemispherical rectifier package functions as a module which can be stacked in series with like modules to increase, at the circuit designer's option, the overall operating voltage of the rectifier. Rectification up to 150 kilovolts or greater is readily provided by these devices. It is an object of the present invention to provide a packaging configuration for a high voltage rectifier patterned after the above-described rectifier, which will provide further improved high voltage operation.

*Summary of the invention*

In accordance with the present invention, the novel high voltage rectifier comprises an axially symmetric, smoothly and continuously curved, generally hemispherical housing of insulating material having a somewhat flattened polar region, with a first terminal being a cap located centrally of the polar region of the housing and extending coaxially into the housing, the second terminal being a generally circular disc providing a planar coaxial base for the package and formed with an inwardly extending coaxial cylindrical projection which confronts the inner planar surface of the first terminal to provide a predetermined surge capacitance. A plurality of electrically insulative thermally conductive elements are affixed to the interior surface of the circular disc and are arranged in a path substantially symmetric about the cylindrical projection. Each of the insulative elements has an isolated, electrically conductive portion formed centrally on the surface thereof. At least one solid state diode is connected between each adjacent pair of conductive portions on the insulative elements and the series string of diodes thus formed is connected between the first and second terminals. Thus, a series string of diodes is connected between the terminals of the rectifier, these diodes being arranged in a symmetrical path within the housing, the diodes being effectively connected for thermal conduction to a thermally massive plate by means of the insulative elements.

*Description of the drawings*

The invention will be more fully understood from the following detailed description, taken in conjunction with the accompanyinging drawings, in which.

*Detailed description of the invention*

Figure 1A:
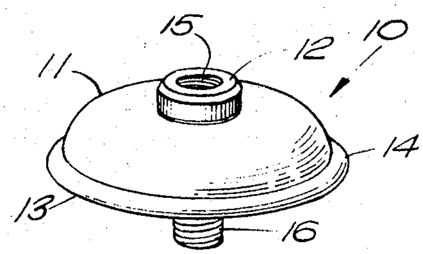
FIGS. 1A and 1B are two exterior views of a high voltage rectifier embodying the invention.
Figure 1B:
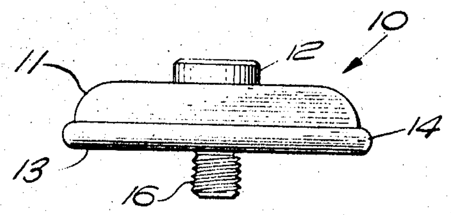

The external appearance of the present high voltage rectifier is illustrated in FIGS. 1A and 1B. The rectifier 10 is of modular construction and comprises an axially symmetric, somewhat flattened, hemispherical insulator 11 terminated at its opposed axial ends by a pair of electrically conductive terminals 12 and 13. A series string of semiconductor diodes, to be described in detail hereinbelow, is arranged wholly within the insulator 11 and connected in series therein between terminals 12 and 13. The terminal 12 provides a relatively small diameter cap for the flattened polar portion of hemispherical insulator 11, while lower terminal 13 appears as a thin circular disc which provides a planar coaxial base for the device. Terminal 12 projects slightly beyond the outer surface of insulator 11 and its upper surface is essentially parallel to the circular lower surface of disc-shaped terminal 13. The outer diameter of terminal 13 is greater than the maximum diameter of insulator 11, the peripheral edge 14 of terminal 13 being a smooth, outwardly turned bead of substantially semi-circular cross section.

Figure 2:
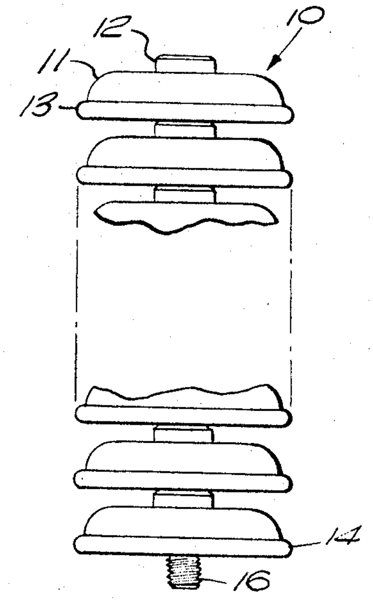
FIG. 2 is an elevation view of a stacked arrangement of rectifiers of the type shown in FIGS. 1A and 1B.

Terminal 12 includes an internally threaded hole 15 and terminal 13 includes an externally threaded stud 16, these threaded portions being of the same size and thread so that the stud of one rectifier module can be threaded into the opening of a corresponding rectifier module, as illustrated in FIG. 2. By threading similar modules together, a stacked rectifier can be provided for a variety of operating voltages. For example, ten modules each rated at 10,000 peak inverse volts can be connected in series as in FIG. 2 to provide an exceedingly compact and rugged rectifier structure rated at 100,000 peak inverse volts. Notwithstanding the exceedingly high voltage, energy dissipation, voltage gradient and corona discharge problems are maintained under control at safe values. Due to the compact nature of the stacked rectifier assembly the entire series string can be readily enclosed within a transformer casing, thus permitting the designer to take advantage of the liquid coolant normally found in such applications.

Figure 3:
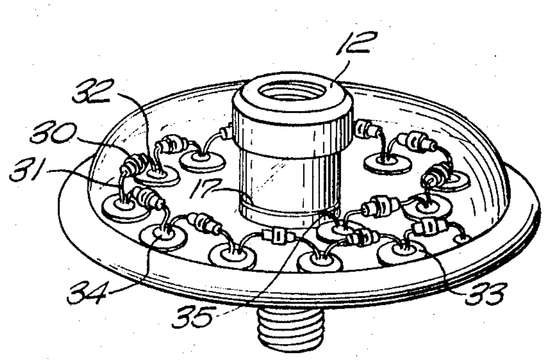
FIG. 3 is a pictorial view of a high voltage rectifier constructed according to the invention.
Figure 4:
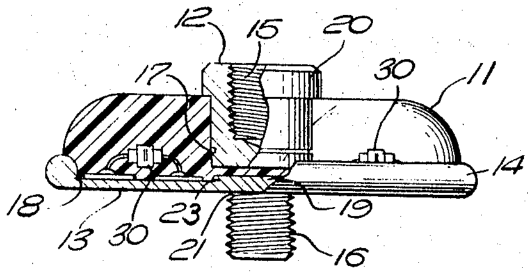
FIG. 4 is an elevation view, partly cut away, of a high voltage rectifier constructed according to the invention.
Figure 5:
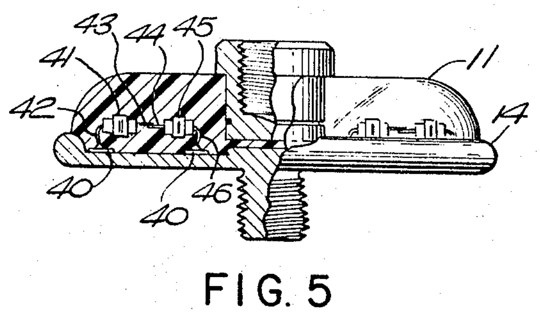
FIG. 5 is an elevation view, partly cut away, of an alternative embodiment of the invention.

The construction of an individual rectifier module embodying the invention is illustrated in FIGS. 3, 4 and 5. Terminal 12 is a cylindrical member which extends axially into the rectifier package. At its upper end, terminal 12 is formed with an external circular flange 20 which permits accurate positioning with respect to insulator 11 during assembly. Terminal 12 is also provided with an internally threaded axially bore 15 and a recessed groove 17 in the central region of the module.

Turning now to terminal 13, the outer peripheral beaded edge is undercut internally at 18, while at its center terminal 13 is provided with both an inwardly extending cylindrical projection 19, undercut at 23, and an external axial stud projection 16 threaded to mate with the internal thread tapped into bore 15 of terminal 12. It should be noted that the axial length of stud 16 is somewhat less than the axial length of threaded bore 15, and that the upper end thread on stud 16 is relieved at 21 to facilitate tightening of the stud into a mating member.

The hemispheric insulator 11 of the rectifier is formed, typically by a transfer molding operation, to have the external geometry previously described. The solid insulating encapsulant is entirely free from air bubbles or other voids and, as is evident, the encapsulant material extends into groove 17 of terminal 12 and into undercut regions 18 and 20 to securely engage all elements of the device and provide a rugged, solid package which is particularly insensitive to shock and vibration. For ease of description, the illustrated insulator is shown as being transparent, although in actual embodiment, such insulator is generally of opaque material. The device can also be encased by an outer shell of the desired geometry, the shell being filled with a suitable insulating encapsulant to form the completed rectifier package. This latter construction is shown in the above-mentioned Patent 3,335,339.

Rectification is provided by a string of diodes serially interconnected between terminals 12 and 13. The diode string includes a plurality of substantially identical solid state diodes 30 each having a pair of thermally and electrically conductive leads 31 and 32 extending from an enclosed solid state rectifying junction, preferably silicon. The diodes are arranged in a planar spiral path around the axis of symmetry of the device, the diodes being individually mounted in a novel manner to enhance thermal dissipation and electrical stability.

More particularly, a plurality of electrically insulative discs 33, of especially high thermal conductivity, typically formed of a ceramic material such as beryllia, are disposed in a spiral path on the interior surface of terminal 13. The discs are metallized on one surface thereof and the discs are affixed to the terminal with the metallized surface in contact with the terminal by well known means, such as by brazing, to afford a thermally conductive path from each disc to the terminal. The upper surface of each disc has formed thereon a metallized or other electrically conductive portion 34 which occupies less than the top surface of the disc and which may be formed on the disc by any well known technique such as by plating or screening. The discs are regularly spaced in their spiral path and the spacing is chosen to accommodate the diodes connected therebetween. A diode 30 is connected, as by brazing or soldering, between each adjacent pair of discs, one diode lead being connected to the conductive portion of one disc while the other diode lead is connected to the conductive portion of an adjacent disc. An additional diode is similarly connected between the outermost disc and terminal 13, while the innermost diode is connected to terminal 12 by a lead 35 connected between the conductive portion of innermost disc 33 and groove 17 of terminal 12. Distribution of the diodes within the symmetrical housing, and the inherently high thermal conductivity of the diode leads and of the ceramic discs affixed to terminal 13, have the effect of minimizing temperature gradients within the device, as well as providing an efficient heat dissipating structure.

As stated previously, the diode string is disposed in spiral fashion about the axis of symmetry of the device. With terminal 12 at a voltage higher than terminal 13, the diodes which are at the higher potential in the string are closer to terminal 12, while the diodes at the lower potential are further from terminal 12. In this manner the planar spiral arrangement of diodes also serves to minimize electrostatic gradients within the device.

The spiral path configuration of diodes is particularly effective for the higher operating voltages of the rectifier. However, the diode path can also be of other configurations. For example, in lower voltage rectifiers, a fewer number of diodes may be used which are disposed in a circular arrangement about the axis of symmetry. In general, the diodes can be arranged in any symmetric configuration consistent with the operating voltage and current requirements of the rectifier.

The flattened hemispherical outer surface of housing 11 provides excellent voltage gradient control between terminals 12 and 13 while the large diameter of terminal 13 with its semicircular peripheral outer edge 14 affords minimum corona discharge at the high voltages contemplated, together with optimum cooling. Although the diameter of the individual solid state diodes 30 may be relatively small, the efficient thermal mounting of these diodes, by way of high thermally conductive discs supported on a thermally massive plate, provides a thermally efficient construction, while the symmetrical arrangement of the diodes in a spiral path affords an efficient electrical construction. Heat generated within the device is transferred by thermal conduction through the diode leads to the ceramic discs and thence to the thermally massive plate 13 where the heat is radiated to the ambient.

An alternative construction is illustrated in FIG. 5 wherein a pair of diodes are connected between each adjacent pair of ceramic discs. Referring to the drawing, there is shown a pair of ceramic discs 40, a first diode 41 having one lead 42 connected to he conductive portion of disc 40, and having its other lead 43 connected, for example by brazing or welding, to a lead 44 of diode 45, the other lead 46 of diode 45 being connected to the conductive portion of the other disc 40. As in the preceding example, each diode has at least one lead, which of course is an excellent thermal conductor, thermally connected to the ceramic disc, for thermal dissipation.

As seen in FIG. 4, the confronting circular faces of terminal 12 and projection 19 define an electrical capacitor, with the encapsulant as a dielectric medium, shunting the entire diode string between the terminals. This capacitive shunt effectively absorbs sharp electrical transients across the series diode string, and eliminates any need for individual shunting resistors or capacitors across diodes 30, as are often employed in prior art techniques.

The number of diodes employed in the series string is of course dependent upon the intended maximum operating voltage and upon the peak inverse voltage characteristics of the individual diodes selected for use. The number of diodes actually required may be determined simply by dividing the anticipated peak inverse voltage by the rated peak inverse voltage of an individual diode. The high current rating of the rectifier package results from the ability of the package to dissipate thermal losses in a most effective manner.

As an example, a rectifier module made in accordance with the principles of this invention, as shown in the drawings, may have a base diameter of approximately three and one half inches with an overall height, not including stud 16, of approximately one inch, and may be made available with peak inverse voltage ratings of 2.5 to 10 kilovolts, with average forward currents of between 6.5 to 2 amperes, respectively. Peak ratings of the device may be increased by operating the device in a commercially available coolant such as Askeral, silicone or mineral oil, Freon or sulphur hexafluoride. The materials used for insulator 11 may be selected from many known materials which are fully compatible with the customary cooling media. The peak ratings can also be increased by employing an extender plate which is placed over stud 16 in contact with the base electrode. This plate is circular and has a smooth, rounded peripheral edge, and serves to increase the head radiation area.

From the foregoing, it will be apparent that the novel high voltage rectifier disclosed herein provides a convenient and efficient solid state device for numerous application in high voltage energy conversion. Many modifications within the scope of the present teachings may now be suggested to one skilled in the art. For example, although the ceramic thermally conductive elements have been shown as discs, it is of course apparent that other functionally equivalent configurations can also be employed. Furthermore, it should be readily apparent that the male and female portions of the terminals can be reversed as may be desired.

What is claimed is:

1. A high voltage rectifier comprising:

an axially symmetric, smoothly and continuously curved, generally hemispherical package of insulative material having a pair of axially spaced conductive electrical terminals, the first of said terminals being a generally cylindrical member providing a relatively small diameter cap for the central polar portion of said housing extending coaxially into said housing, the second of said terminals being a generally circular disc shaped member providing a planar coaxial base for said package and formed with an outwardly curved peripheral edge having a diameter slightly larger than the base diameter of said housing, and a rectifying circuit arrangement encapsulated within said package and formed of serially connected solid state diodes each having a pair of conductive leads, said rectifying circuit being serially connected between said first and second terminals, a plurality of electrically insulative elements of high thermal conductivity affixed along the inner surface of said circular disc shaped member and arranged in a path about the axis of said rectifier, each of said insulative elements having an isolated electrically conductive portion disposed on a surface thereof not affixed to said terminal disc, at least one lead of each of said idodes being connected to a respective conductive portion on said insulative elements for enhancing the dissipation of heat from said diodes to said conductive disc shaped terminal member.

2. A rectifier in accordance with claim 1 wherein said insulative elements are ceramic discs, each having a metallized surface secured to said circular disc shaped terminal member.

3. A rectifier in accordance with claim 1 wherein said plurality of electrically insulative elements of high thermal conductivity are arranged on one surface of said circular disc shaped terminal member in a spiral path about the axis of said rectifier.

4. A rectifier in accordance with claim 1 wherein a pair of serially connected diodes are connected between each adjacent pair of insulative elements.

5. A rectifier in accordance with claim 1 wherein the cylindrical member of said first terminal terminates within said housing in a circular planar surface, and said second terminal includes an inwardly extending coaxial cylindrical projection having a substantially planar circular surface confronting said inner planar surface of said first terminal and providing a predetermined electrical surge capacitance.

6. A rectifier in accordance with claim 1 wherein a diode is connected between each adjacent pair of insulative elements.

7. A rectifier in accordance with claim 3 further including at least one diode connected between the conductive portion of the insulative disc nearest said peripheral edge and the circular disc shaped member of said second terminal, and a conductive lead connected between the conductive portion of the insulative disc nearest said cylindrical projection and the cylindrical member of said first terminal.

8. A rectifier in accordance with claim 7 wherein the cylindrical member of said first terminal has a recessed groove therein, and said conductive lead is secured within said groove.

References Cited

UNITED STATES PATENTS

| | | | |
|---|---|---|---|
| 2,861,227 | 11/1958 | Scherbaum. | |
| 2,984,773 | 5/1961 | Guldemono et al. | 317—234 |
| 3,229,188 | 1/1966 | Schuler | 321—27 |
| 3,295,046 | 12/1966 | Margaira | 321—8 |
| 3,335,339 | 8/1967 | Schuler | 317—234 |
| 3,398,349 | 8/1968 | Evans et al. | 321—27 XR |

JOHN F. COUCH, *Primary Examiner.*

W. M. SHOOP, JR., *Assistant Examiner.*

U.S. Cl. X.R.

317—234